United States Patent
Oba et al.

(10) Patent No.: US 9,958,314 B2
(45) Date of Patent: May 1, 2018

(54) VIBRATION DETECTION MECHANISM AND VIBRATION SENSOR UNIT

(71) Applicant: YAMAHA CORPORATION, Hamamatsu-shi, Shizuoka (JP)

(72) Inventors: Yasuhiko Oba, Hamamatsu (JP); Shinya Koseki, Fukuroi (JP)

(73) Assignee: YAMAHA CORPORATION, Hamamatsu-Shi (JP)

( * ) Notice: Subject to any disclaimer, the term of this patent is extended or adjusted under 35 U.S.C. 154(b) by 61 days.

(21) Appl. No.: 15/102,339

(22) PCT Filed: Dec. 24, 2014

(86) PCT No.: PCT/JP2014/084094
§ 371 (c)(1),
(2) Date: Jun. 7, 2016

(87) PCT Pub. No.: WO2015/098936
PCT Pub. Date: Jul. 2, 2015

(65) Prior Publication Data
US 2016/0327428 A1 Nov. 10, 2016

(30) Foreign Application Priority Data
Dec. 24, 2013 (JP) ................................. 2013-265338

(51) Int. Cl.
*G10C 3/06* (2006.01)
*G10G 3/04* (2006.01)
(Continued)

(52) U.S. Cl.
CPC ................. *G01H 1/00* (2013.01); *G01H 3/00* (2013.01); *G10C 3/06* (2013.01); *G10G 3/04* (2013.01); *G10H 3/146* (2013.01)

(58) Field of Classification Search
CPC ............ G01H 3/00; G01H 1/00; G10H 3/146; G10G 3/04; G10C 3/06
(Continued)

(56) References Cited

U.S. PATENT DOCUMENTS 3,624,264 A     11/1971   Lazarus
4,972,082 A  *  11/1990   Loomis .................. G01V 5/104
                                                   250/262

(Continued)

FOREIGN PATENT DOCUMENTS

JP    S63118667 A    5/1988
JP    H06236177 A    8/1994
(Continued)

OTHER PUBLICATIONS

Extended European Search Report issued in European Appln. No. 14875089.6 dated Jun. 29, 2017.
International Search Report issued in Intl. Appln. No. PCT/JP2014/084094 dated Mar. 24, 2015. English translation provided.
Written Opinion issued in Intl. Appln. No. PCT/JP2014/084094 dated Mar. 24, 2015.

*Primary Examiner* — J M Saint Surin
(74) *Attorney, Agent, or Firm* — Rossi, Kimms & McDowell LLP

(57) ABSTRACT

A vibration detection mechanism includes: a first sensor section that detects vibration of a vibrating member of a musical instrument in a first direction being a main vibration direction; a second sensor section that detects vibration of the vibrating member in a second direction being approximately perpendicular to the first direction; and a third sensor section that detects vibration of the vibrating member in a third direction being approximately perpendicular to both the first direction and the second direction. Sensitivity of the second sensor section is greater than sensitivity of the first sensor section. Sensitivity of the third sensor section is greater than the sensitivity of the first sensor section.

10 Claims, 8 Drawing Sheets

(51) Int. Cl.
*G10H 3/14* (2006.01)
*G01H 3/00* (2006.01)
*G01H 1/00* (2006.01)

(58) Field of Classification Search
USPC .......................................................... 73/649
See application file for complete search history.

(56) References Cited

U.S. PATENT DOCUMENTS

| | | | |
|---|---|---|---|
| 5,212,336 A | | 5/1993 | Barcus |
| 5,247,129 A | * | 9/1993 | Nozaki .................. G10H 1/055 |
| | | | 84/192 |
| 7,034,218 B1 | | 4/2006 | Lazarus et al. |
| 7,235,734 B2 | * | 6/2007 | Hosler .................. G10H 3/146 |
| | | | 84/725 |
| 7,291,780 B2 | * | 11/2007 | Hosler .................. G10H 3/146 |
| | | | 84/723 |
| 2007/0221035 A1 | | 9/2007 | Muramatsu |
| 2012/0090449 A1 | * | 4/2012 | Lee ........................ G10H 3/143 |
| | | | 84/731 |

FOREIGN PATENT DOCUMENTS

| | | |
|---|---|---|
| JP | H09106274 A | 4/1997 |
| JP | 2003186476 A | 7/2003 |
| JP | 2007256538 A | 10/2007 |

\* cited by examiner

VIBRATION DETECTION MECHANISM AND VIBRATION SENSOR UNIT

TECHNICAL FIELD

The present invention relates to a vibration detection mechanism and a vibration sensor unit that detect vibration of a vibrating member of a musical instrument.

Priority is claimed on Japanese Patent Application No. 2013-265338, filed Dec. 24, 2013, the content of which is incorporated herein by reference.

BACKGROUND ART

Conventionally, known is the detection of vibration of a vibrating member of a musical instrument. In a piano, a string vibrates as a result of being played, and this is accompanied by vibration of a vibrating member such as a soundboard for example. In order to record and later play back the playing of a piano, a sensor is arranged in the piano, and vibration of the vibrating member is detected by the sensor. In Patent Document 1 described below, a vibration sensor is installed on a soundboard, and a vibration waveform is detected by the sensor. The soundboard mainly vibrates such that a direction perpendicular to the plane thereof is a main vibration direction. Consequently, in Patent Document 1 described below, vibration in the main vibration direction of the soundboard is mainly detected.

However, a soundboard vibrates not just in a main vibration direction, but also in a plane direction perpendicular to the main vibration direction for example. The synthesis of complex vibration in three axis directions gives rich acoustics. Consequently, if sound that is true to an original sound is to be reproduced, it is preferable to detect not just vibration in a main vibration direction, but also vibrations in a plane direction. In a case where a sensor for detecting vibration in three axis directions is to be installed in an existing acoustic piano, the use of a three-axis sensor represented by Patent Document 2 described below can be considered for example.

PRIOR ART DOCUMENTS

Patent Document

[Patent Document 1] Japanese Unexamined Patent Application, First Publication No. 2003-186476

[Patent Document 2] Japanese Unexamined Patent Application, First Publication No. S63-118667

SUMMARY OF THE INVENTION

Problem to be Solved by the Invention

However, in commercial three-axis sensors, the sensitivity of the sensor is usually common with respect to the three directions. On the other hand, vibration of a soundboard is such that the amplitude is smaller in the plane direction in comparison to the main vibration direction. Consequently, in order to detect vibration in three axis directions by installing a typical three-axis sensor, it is necessary to match the sensitivity to detection in the main vibration direction. As a result, the signal-to-noise ratio (S/N ratio) of vibration detection signals in the plane direction decreases, and it becomes difficult to reproduce realistic acoustics. Therefore, high-quality vibration detection in each of the three axis directions becomes difficult.

Moreover, it is desirable for the installation operation of the sensor to be simple. In particular, with respect to determining the orientation, it is desirable for it to be a configuration that does not require special skills. Further, the vibrating member, which represents a vibration detection subject, is in no way limited to a soundboard. Consequently, according to the vibrating member on which the sensor is installed, it is desirable for the degree of freedom associated with the setting of the sensor sensitivity to be high in each of the three axis directions.

The present invention has been achieved in order to resolve the conventional technical problems described above. An exemplary object of the present invention is to provide a vibration detection mechanism and a vibration sensor unit that are able to detect complex vibration of a vibrating member of a musical instrument with a high quality.

Means for Solving the Problem

A vibration detection mechanism according to an aspect of the present invention includes: a first sensor section that detects vibration of a vibrating member of a musical instrument in a first direction being a main vibration direction; a second sensor section that detects vibration of the vibrating member in a second direction being approximately perpendicular to the first direction; and a third sensor section that detects vibration of the vibrating member in a third direction being approximately perpendicular to both the first direction and the second direction. Sensitivity of the second sensor section is greater than sensitivity of the first sensor section. Sensitivity of the third sensor section is greater than the sensitivity of the first sensor section.

A vibration sensor unit according to an aspect of the present invention includes: an installation surface for installation on a surface that is of a vibrating member of a musical instrument or a member fixed to the vibrating member and is approximately perpendicular to a first direction being a main vibration direction; a first surface that is approximately parallel to the installation surface; a second surface that is approximately perpendicular to the first surface; a third surface that is approximately perpendicular to both the first surface and the second surface; a first sensor section that is installed on the first surface and detects vibration of the vibrating member in the first direction; a second sensor section that is installed on the second surface and detects vibration of the vibrating member in a second direction being approximately perpendicular to the first direction; and a third sensor section that is installed on the third surface and detects vibration of the vibrating member in a third direction being approximately perpendicular to both the first direction and the second direction. Sensitivity of the second sensor section is greater than sensitivity of the first sensor section. Sensitivity of the third sensor section is greater than the sensitivity of the first sensor section.

Effect of the Invention

According to the present invention, complex vibration of a vibrating member in a musical instrument can be detected with a high quality.

EMBODIMENTS FOR CARRYING OUT THE INVENTION

Hereunder, embodiments of the present invention are described with reference to the drawings.

Figure 1:
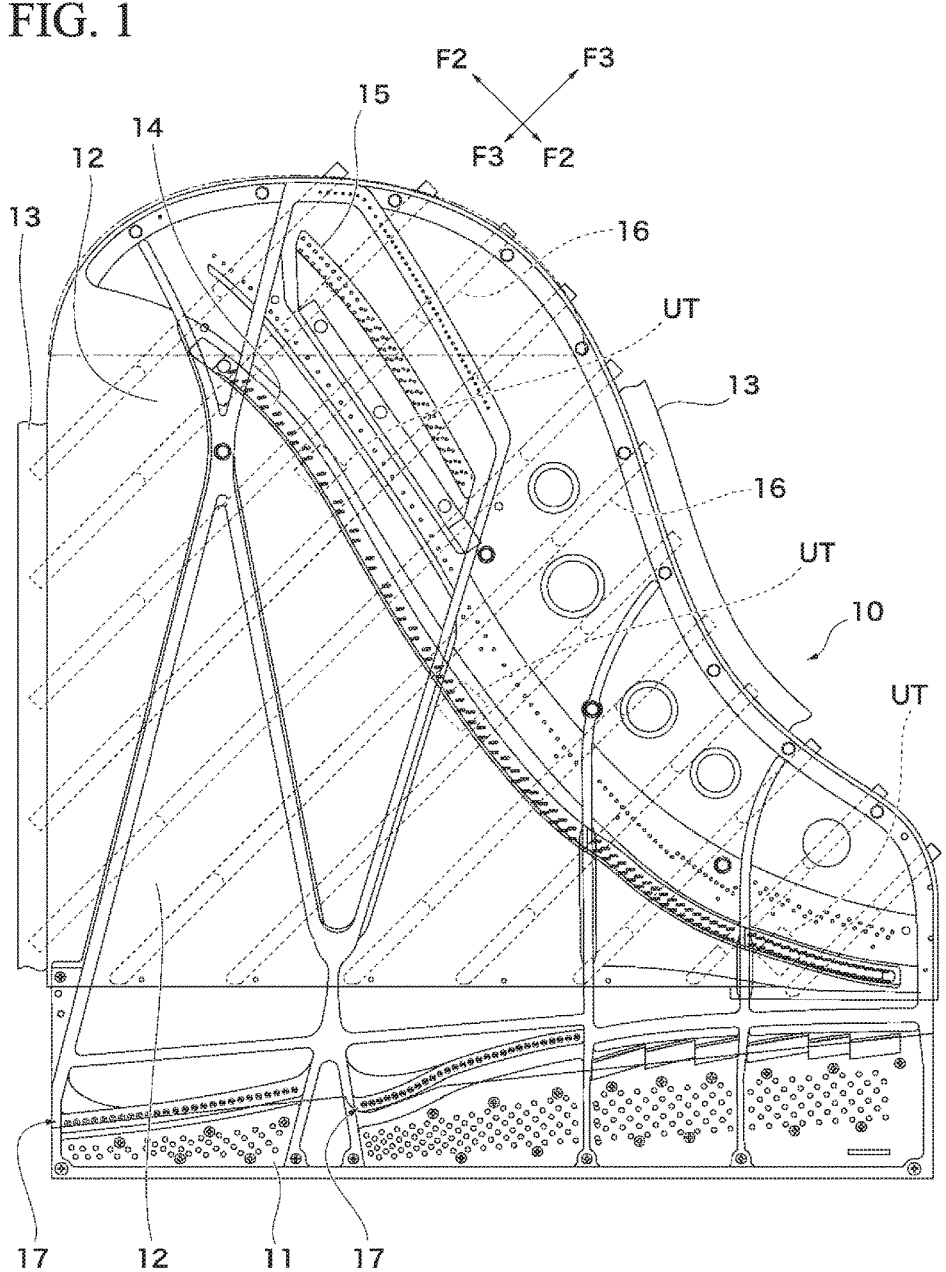
FIG. 1 is a plan view of main parts of a musical instrument to which a vibration detection mechanism and a vibration sensor unit according to an embodiment of the present invention are applied.

FIG. 1 is a plan view of main parts of a musical instrument to which a vibration detection mechanism and a vibration sensor unit according to an embodiment of the present invention are applied. The musical instrument shown in FIG. 1 is a piano 10. The musical instrument to which the vibration detection mechanism and the vibration sensor unit are applied is in no way limited to a piano. The piano 10 is more specifically an acoustic grand piano. In FIG. 1, the lid, the strings, the keyboard, and the like, are omitted.

The piano 10 may be a piano with a well-known configuration. The piano 10 includes a sideboard 13, a soundboard 12, a frame 11, a long bridge 14, a short bridge 15, a plurality of sound ribs 16, and the like. A sensor unit UT is arranged in the piano 10. The sensor unit UT may be installed in the piano 10 prior to shipment of the piano 10. A user may install the sensor unit UT in the piano 10 after the user has purchased the piano 10. At least one sensor unit UT is arranged in the piano 10. The number of sensor units UT arranged in the piano 10 is not particularly limited. In the example of FIG. 1, three sensor units UT are arranged in the piano 10.

The sensor unit UT has a sensor for detecting vibration of a vibrating member that vibrates as a result of vibration of the strings of the piano 10. In the configuration representing the present embodiment shown in FIG. 1 to FIG. 3B, the soundboard 12 is exemplified as a vibrating member representing a detection subject.

The plurality of strings of the piano 10 are tensed at the frame 11 by means of a pitch pin and a tuning pin, from an agraffe 17 to a long bridge 14 or a short bridge 15. The strings vibrate by being struck by a hammer according to a playing operation. Vibration of the strings is transmitted to the soundboard 12 via the long bridge 14 and the short bridge 15. The long bridge 14 and the short bridge 15 are fixed to an upper surface (first soundboard surface) of the soundboard 12. The plurality of sound ribs 16 are fixed to a lower surface (second soundboard surface) of the soundboard 12. The plurality of sound ribs 16 are arranged such that they are mutually parallel.

Figure 2A:
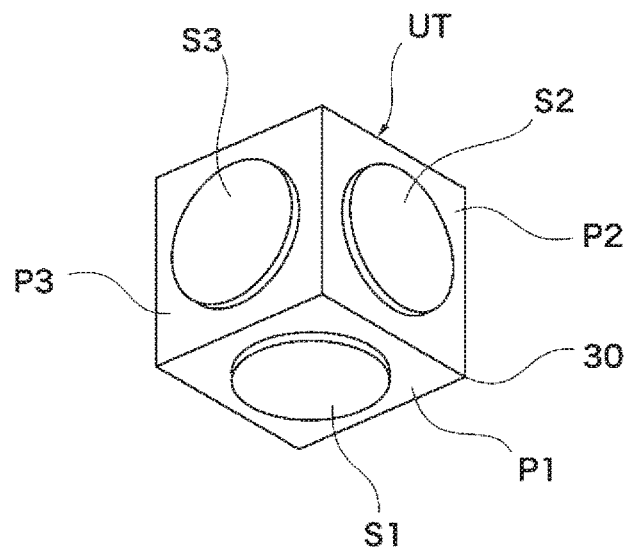
FIG. 2A is a perspective view of a sensor unit according to the embodiment of the present invention.
Figure 2B:
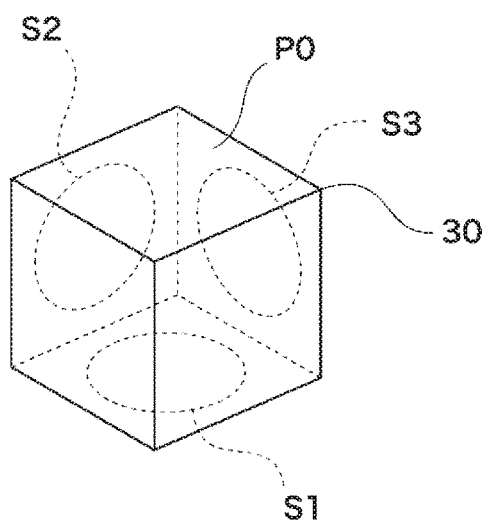
FIG. 2B is a perspective view of the sensor unit shown in FIG. 2A.

FIG. 2A and 2B are perspective views of the sensor unit UT. The sensor unit UT has a cube-shaped base 30. The base 30 may also have a rectangular parallelepiped shape (refer to FIG. 4C). Three sensors S1, S2, and S3 are arranged on the base 30. Specific examples of the three sensors S1, S2, and S3 include a piezo element, an acceleration sensor, and a speed sensor. The base 30 has an installation surface P0 for installation on a vibrating member, such as the soundboard 12. The installation surface P0 is equipped with double-sided tape not shown in the figure. The surface on the opposite side to the installation surface P0 is a first surface P1 that is parallel to the installation surface P0. Further, the base 30 has a second surface P2 that is approximately perpendicular to the first surface P1, and a third surface P3 that is approximately perpendicular with respect to both the first surface P1 and the second surface P2.

The sensors S1, S2, and S3 are respectively fixed to the first surface P1, the second surface P2, and the third surface P3 by adhesion, and the like. The sensors S1, S2, and S3 are respectively used for detecting vibration in directions perpendicular to the surface P1, the surface P2, and the surface P3. Each of the three sensor units UT shown in FIG. 1 are the same.

Figure 2C:
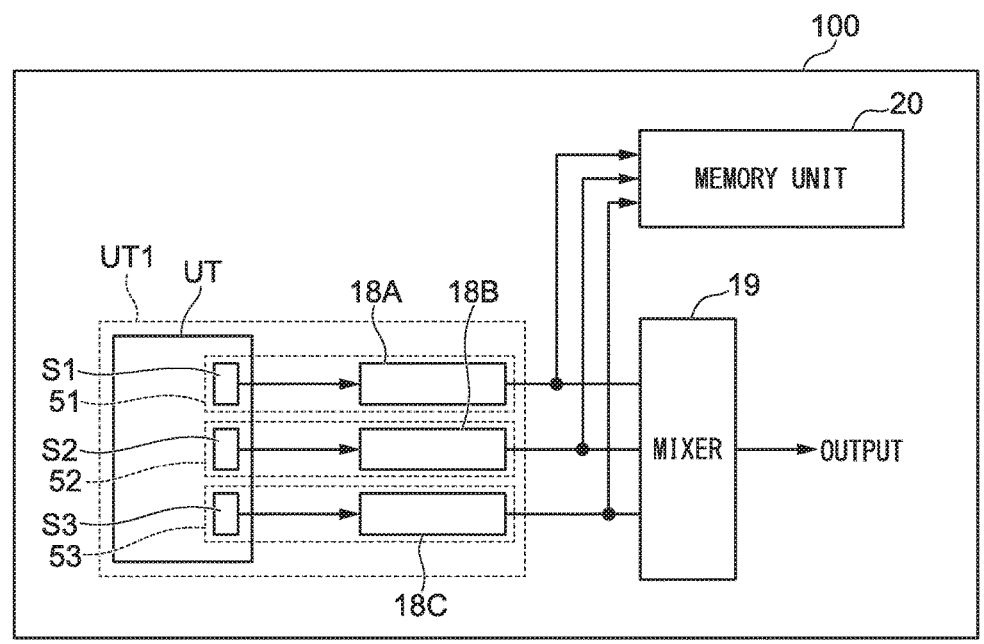
FIG. 2C is a block diagram showing an acoustic apparatus according to the embodiment of the present invention.

FIG. 2C is a diagram showing the signal flow at the time of vibration detection by a sensor unit UT. As shown in FIG. 2C, the acoustic apparatus 100 includes a sensor unit UT, amplifiers 18A, 18B, and 18C, a mixer 19, and a memory unit 20. The respective sensors S1, S2, and S3 output detection signals. The detection signals from the sensors S1, S2, and S are respectively amplified by the amplifiers 18A, 18B, and 18C. Each of the signals amplified by the amplifiers 18A, 18B, and 18C may be recorded in the memory unit 20. The output of the amplifiers 18A, 18B, and 18C may be mixed by the mixer 19, and a synthesized signal may be output to the exterior. Detection signals from a plurality of sensor units UT may be further synthesized, and the synthesized signal may be recorded or output.

The sensor section 51 includes a sensor S1 that detects vibration, and an amplifier 18A that amplifies vibration detected by the sensor S1. A configuration including the sensor S1 alone may be referred to as a sensor section in some cases. The sensor section 52 includes a sensor S2 that detects vibration, and an amplifier 18B that amplifies vibration detected by the sensor S2. A configuration including the sensor S2 alone may be referred to as a sensor section in some cases. The sensor section 53 includes a sensor S3 that detects vibration, and an amplifier 18C that amplifies vibration detected by the sensor S3. A configuration including the sensor S3 alone may be referred to as a sensor section in some cases.

As shown in FIG. 2C, the sensor unit UT 1 includes a sensor unit UT, and amplifiers 18A, 18B, and 18C.

The amplifiers 18A to 18C and the mixers 19A to 19C may be built into the sensor unit UT. In the same manner, the memory unit 20 may be built into the sensor unit UT. The signals recorded in the memory unit 20 are utilized for reproducing acoustics.

The amplifiers 18A to 18C may have a function that modifies the frequency characteristics of a signal, that is to say, an equalizer function. In the same manner, the mixers 19A to 19C may have a function that modifies the frequency characteristics of a signal, that is to say an equalizer function.

The sensor unit UT is installed on the vibrating member in a piano, and detects vibration of the vibrating member in each of the three axis directions. The direction in which the vibrating member vibrates the largest (with the largest amplitude) is fixed, and the direction thereof is referred to as the main vibration direction. The magnitude of vibration of the vibrating member in the directions perpendicular to the main vibration direction are smaller than in the main vibration direction. Among the three sensors, the sensor S1 detects vibration in the main vibration direction of the vibrating member. The sensors S2 and S3 detect vibration in the two axis directions that are perpendicular to the main vibration direction.

Consequently, as an example, the sensor sensitivity of the sensors S2 and S3 are mutually the same. Furthermore, the sensor sensitivity of the sensors S2 and S3 are set to be greater than the sensor sensitivity of the sensor S1.

As another example, the sensor sensitivity of the sensors S1, S2, and S3 may be made to be mutually the same. In this case, the signal amplification factors of the amplifiers 18B and 18C are set to be greater than the signal amplification factor of the amplifier 18A. As a result, the sensitivity of the sensor sections 52 and 53 becomes greater than the sensitivity of the sensor section 51.

That is to say, as long as the sensitivity of the sensor sections 52 and 53 are set to be greater than the sensitivity of the sensor section 51, then the sensitivity of the sensors S1 to S3 and the signal amplification factor of the amplifiers 18A to 18C may be arbitrarily set.

The reason for setting the sensor sensitivity in the manner mentioned above is in order to make reproduction of realistic acoustics possible. That is to say, the vibrating member vibrates the largest in the main vibration direction. Consequently, the sensitivity of the sensor S1 (or the sensor section 51) is set to be low, such that the detection signal does not become saturated. On the other hand, vibration in the two axis directions perpendicular to the main vibration direction are smaller than in the main vibration direction. Consequently, the magnitude of the detected signal is weaker compared to the main vibration direction. As a result, the sensitivity of the sensors S2 and S3 (or the sensor sections 52 and 53) are set to be high, with an object of also avoiding a decrease in the S/N ratio of the detected signal. If the detection subject is a plate-shaped member such as the soundboard 12 for example, it is desirable for the sensitivity ratio between the sensors S2 and S3 and the sensor S1 (or the sensitivity ratio between the sensor sections 52 and 53 and the sensor section 51) to be set to at least two times or more. The sensitivity of the sensor S2 and the sensor S3 (or the sensitivity of the sensor section 52 and the sensor section 53) do not necessarily need to be the same.

Figure 3A:
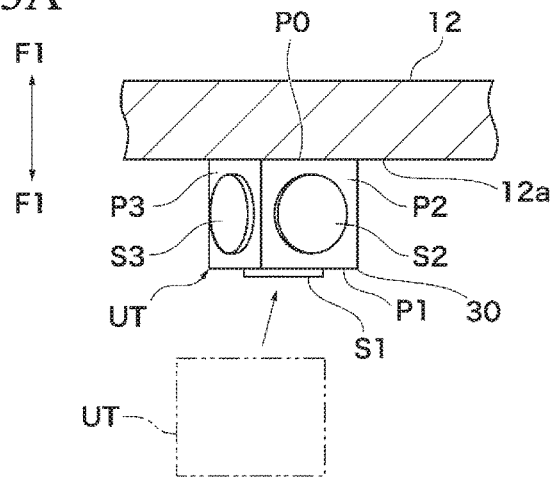
FIG. 3A is a diagram showing an example of installation of the sensor unit on a soundboard shown in FIG. 1, as viewed from the performer side.
Figure 3B:
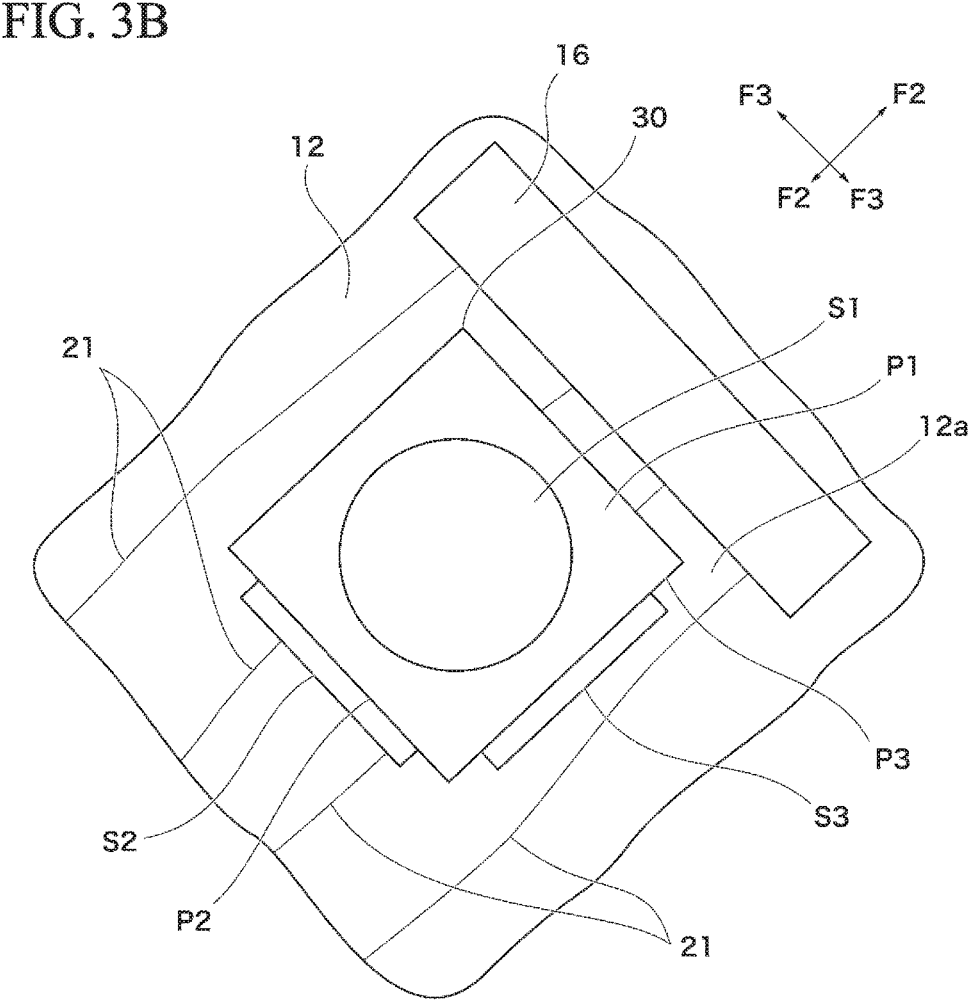
FIG. 3B is a back view of the sensor unit shown in FIG. 2A installed on the soundboard.

FIG. 3A is a diagram showing an example of installing a sensor unit UT on the soundboard 12, as viewed from the performer side. FIG. 3B is a back view of the sensor unit UT installed on the soundboard 12.

In a case where vibration of the soundboard 12 is detected by the sensor unit UT, the installation surface P0 is fixed by adhesion to a lower surface 12a of the soundboard 12. As a result, the first surface P1 faces downward. There are no limitations with respect to which horizontal direction the second surface P2 and third surface P3 are oriented toward. However, it is preferable to arrange the second surface P2 or the third surface P3 such that it becomes perpendicular with respect to the extending direction of a wood grain 21 of the soundboard 12. The reason for this is because vibration in the plane direction of the soundboard 12 is more easily propagated in a direction along the wood grain 21 than in a direction straddling the wood grain 21. If the base 30 is composed of wood, it is preferable for the extending direction of the wood grain of the base 30 to be aligned with the extending direction of the wood grain 21 of the soundboard 12.

In the example of FIG. 3A and 3B, the second surface P2 is arranged such that it is approximately perpendicular to the direction of the wood grain 21 at the installation position of the base 30 on the soundboard 12. The vertical direction being the main vibration direction of the soundboard 12 is referred to as a first direction F1. The direction of the wood grain 21 is referred to as a second direction F2. The direction perpendicular to the first direction F1 and the second direction F2 is referred to as a third direction F3. The sensor S1 detects vibration in the direction F1 of the soundboard 12. The sensor S2 detects vibration in the direction F2 of the soundboard 12. The sensor S3 detects vibration in the direction F3 of the soundboard 12.

The longitudinal direction of the sound rib 16 is set to a direction that is generally perpendicular to the wood grain direction. Therefore, the third direction F3, which is approximately perpendicular to the third surface P3, is approximately parallel to the longitudinal direction of the sound rib 16. The arrangement of the sensor unit UT in the horizontal direction is preferably an arrangement in which the sensor unit UT overlaps the long bridge 14 in a plan view (that is to say, when viewed from a direction perpendicular to the surface of the soundboard 12) (refer to FIG. 1). The reason why such an arrangement is preferable is because vibration transmitted from the strings is transmitted to the soundboard 12 via the long bridge 14, and therefore, clear vibration appears at the lower surface of the soundboard 12 on the lower side of the long bridge 14. The sensor unit UT may be arranged such that it overlaps with the short bridge 15 rather than the long bridge 14 in a plan view.

The base 30 is preferably configured by a material having frequency characteristics suitable for tone control. The material of the base 30 is in no way limited to wood. A metal such as aluminum or a resin may be selected as a material of the base 30. The method of fixing the sensors S1, S2, and S3 is in no way limited to direct adhesion of the sensors S1, S2, and S3 to the base 30. The sensors S1, S2, and S3 may be fixed to the base 30 via a fixed member having suitable frequency characteristics.

According to the present embodiment, the sensitivity of the sensors S2 and S3 is set to be greater than the sensitivity of the sensor S1 (or the sensitivity of the sensor sections 52 and 53 is set to be greater than the sensitivity of the sensor section 51). As a result of this configuration, it is possible to appropriately detect vibration in the first direction F1 by matching the sensitivity of the sensor S1 (or the sensor section 51) to the amplitude in the first direction F1, which is the main vibration direction of the soundboard 12. At the same time, vibration in the second direction F2 and the third direction F3 is respectively detected by matching the sensitivity of the sensors S2 and S3 (or the sensor sections 52 and 53) to the amplitude in directions that differ from the first direction F1. As a result, a decrease in the S/N ratio of the detected signals of vibration in the second direction F2 and the third direction F3 can be avoided. Therefore, highly accurate vibration detection becomes possible with respect to each of the three axis directions of the soundboard 12, and complex vibration can be detected with a high quality. Thus, it becomes possible to reproduce realistic acoustics.

According to the present embodiment, the second direction F1 is approximately parallel to the wood grain direction of the soundboard 12 at the installation position of the base 30 on the soundboard 12. Here, vibration is readily propagated in the wood grain direction. Therefore, as a result of this configuration, it is possible to increase the vibration detection accuracy. Further, the first sensor S1 is arranged in a position that overlaps with the long bridge 14 in a plan view. Since clear vibration appears at the lower surface of the soundboard on the lower side of the long bridge 14, then as a result of this configuration, it is possible to increase the vibration detection accuracy. Furthermore, at the time the sensor unit UT is installed on the soundboard 12, it is sufficient for the user to match the orientation of the sensor S2 to the wood grain direction of the soundboard 12. Consequently, special skills are not necessary for determining the orientation of the sensor unit UT in the horizontal direction.

According to the present embodiment, the sensor unit UT is fixed to the base 30 such that the sensors S1, S2, and S3 are oriented in directions that are mutually orthogonal. That is to say, the sensors S1, S2, and S3 are all integrally configured. Furthermore, the sensor unit UT has an installation surface P0. Therefore, as a result of a simple operation of attaching the installation surface P0 to the lower surface 12a of the soundboard 12, the installation of the sensor that is able to appropriately detect vibration in three axis directions becomes possible. That is to say, the installation operation of the sensor is simple.

In the example shown in FIG. 1, and FIG. 3A and 3B, the sensor unit UT is installed on the lower surface 12a of the soundboard 12. However, it is in no way limited to such a configuration. It is sufficient for the base 30 to be installed on the vibrating member or a fixed member that is fixed to the vibrating member, such that the first surface P1 becomes approximately perpendicular to the first direction F1. A first to a fourth modified example that satisfies such a condition are shown in FIG. 4A to 4D.

Figure 4A:
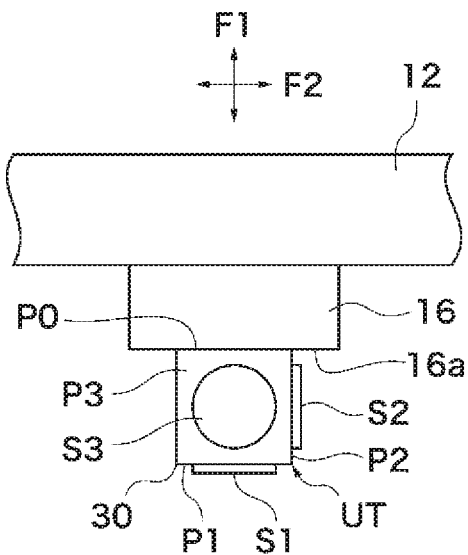
FIG. 4A is a diagram showing a modified example of installation of a sensor unit in the embodiment of the present invention.

FIG. 4A shows a first modified example of installing a sensor unit UT. In the first modified example, an installation surface P0 of a base 30 is fixed by adhesion to a lower surface 16a of a sound rib 16, which represents a vibrating member. The main vibration direction (first direction F1) of the sound rib 16 is the same as for the soundboard 12.

Figure 4B:
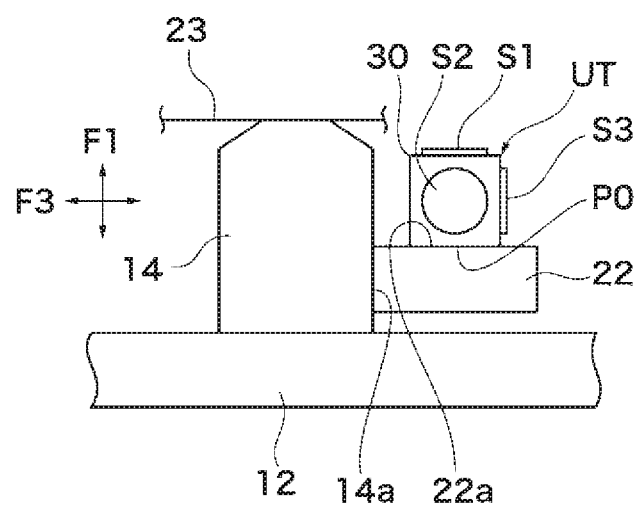
FIG. 4B is a diagram showing a modified example of installation of a sensor unit in the embodiment of the present invention.

FIG. 4B shows a second modified example of installing a sensor unit UT. In the second modified example, a fixed member 22 is fixed to a side surface 14a of a long bridge 14 (or a short bridge 15), which represents a vibrating member. An installation surface P0 of a base 30 is fixed by adhesion to an upper surface 22a of the fixed member 22. The main vibration direction (first direction F1) of the long bridge 14 is the same as for the soundboard 12. The upper surface 22a is approximately perpendicular to the first direction F1.

The sound rib 16 and the long bridge 14 are specific examples of a vibrating member. However, if the soundboard 12 is regarded as a vibrating member, the base 30, the sound rib 16, and the long bridge 14 may also be regarded as "(fixed) members that are fixed to the vibrating member".

Figure 4C:
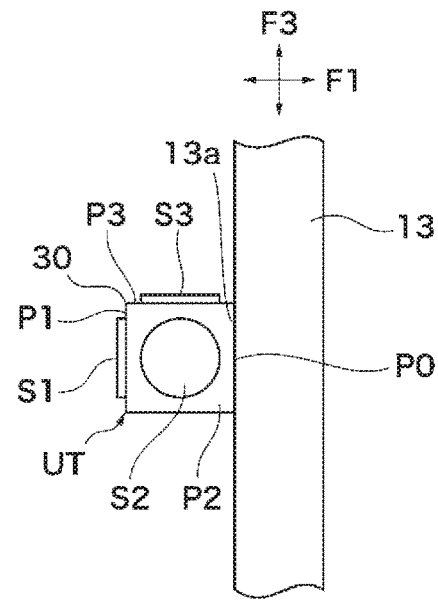
FIG. 4C is a diagram showing a modified example of installation of a sensor unit in the embodiment of the present invention.

FIG. 4C shows a third modified example of installing a sensor unit UT. In the third modified example, an installation surface P0 of a base 30 is fixed by adhesion to an inner surface 13a (or an outer surface) of a sideboard 13, which represents a vibrating member. The main vibration direction (first direction F1) of the sideboard 13 becomes the thickness direction of the sideboard 13, and is approximately orthogonal to the main vibration direction of the soundboard 12. A second surface P2 and a third surface P3 are surfaces that are perpendicular to the thickness direction of the sideboard 13, and are mutually orthogonal.

Figure 4D:
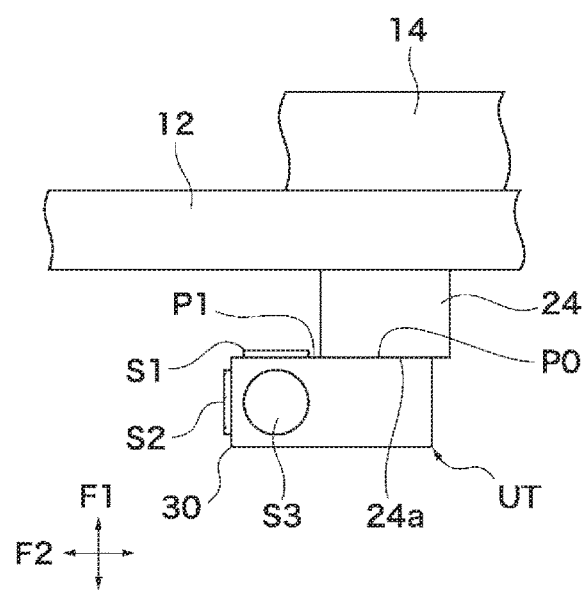
FIG. 4D is a diagram showing a modified example of installation of a sensor unit in the embodiment of the present invention.

FIG. 4D shows a fourth modified example of installing a sensor unit UT. In the fourth modified example, the sensor unit UT is such that an installation surface P0 of a base 30 is flush with a first surface P1 of the base 30. Further, the installation surface P0 and the first surface P1 are essentially separate regions on the same plane. In this configuration, the installation surface P0 of the base 30 is fixed by adhesion to a lower surface 24a of a fixed member 24 that is fixed to a lower surface 12a of a soundboard 12, which represents a vibrating member for example. Therefore, the sensor S1 faces an upward direction. Even in such an arrangement, a sensor S1 is able to detect vibration in the main vibration direction (first direction F1) of the soundboard 12.

In this manner, the vibrating member, which represents a vibration detection subject, is in no way limited to the soundboard 12. In the sensor unit UT, the degree of freedom in the sensitivity setting for each direction is high. Therefore, it is possible to create a sensor unit UT in which the sensitivity of each of the sensors S1, S2, and S3 (or the sensor sections 51, 52, and 53) are appropriately set according to the vibration detection subject.

The foregoing has described a configuration in which a sensor unit UT with three integrated sensors is installed on a vibrating member. However, it is in no way limited to such a configuration. The sensitivity of the sensors S2 and S3 is set to be greater than that of the sensor S1 (or the sensitivity of the sensor sections 52 and 53 is set to be greater than that of the sensor section 51), and each sensor may be individually installed on a vibrating member or a member that is fixed to a vibrating member. More specifically, a first to a fourth example in which the sensors S1 to S3 are individually installed are described with reference to FIG. 5A to 5E.

Figure 5A:
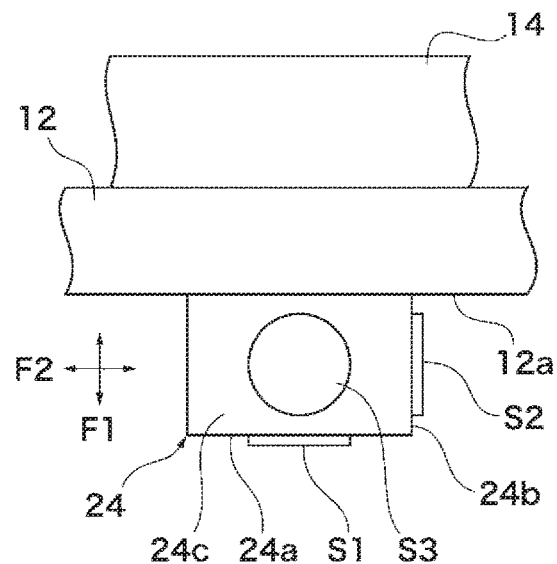
FIG. 5A is a diagram showing an example of individual installation of a sensor in the embodiment of the present invention.

FIG. 5A shows a first example of individually installing the sensors S1 to S3. In the first example, a rectangular parallelepiped-type fixed member 24 is fixed to a lower surface 12a of a soundboard 12, which represents a vibrating member. The sensors S1, S2, and S3 are respectively attached to surfaces 24a, 24b, and 24c of the fixed member 24, which are perpendicular to the directions F1, F2, and F3.

Figure 5B:
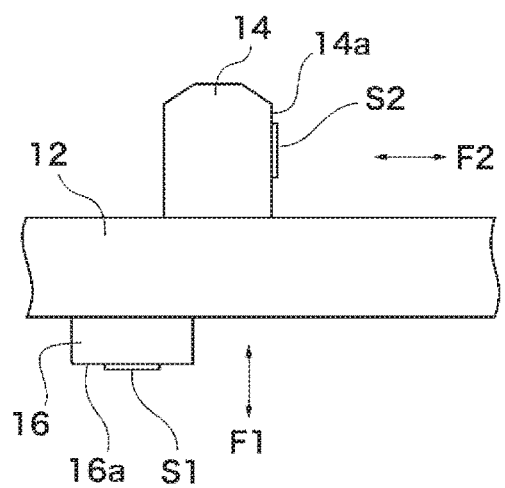
FIG. 5B is a diagram showing an example of individual installation of a sensor in the embodiment of the present invention.

FIG. 5B shows a second example of individually installing the sensors S1 to S3. In the second example, the sensor S1 is attached to a lower surface 16a of a sound rib 16, which represents a vibrating member. The sensor S2 is attached to a side surface 14a of a long bridge 14 (or a short bridge 15), which represents a vibrating member.

Figure 5C:
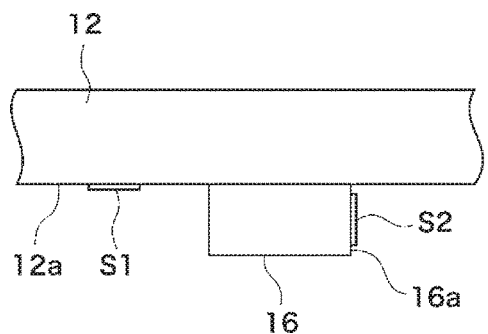
FIG. 5C is a diagram showing an example of individual installation of a sensor in the embodiment of the present invention.

FIG. 5C shows a third example of individually installing the sensors S1 to S3. In the third example, the sensor S1 is attached to a lower surface 12a of a soundboard 12, which represents a vibrating member. The sensor S2 is attached to a side surface 16a of a sound rib 16, which represents a vibrating member.

Figure 5D:
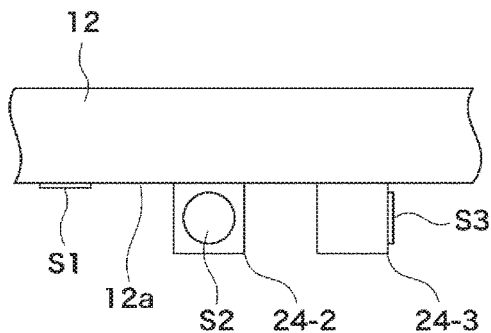
FIG. 5D is a diagram showing an example of individual installation of a sensor in the embodiment of the present invention.

FIG. 5D shows a fourth example of individually installing the sensors S1 to S3. In the fourth example, the sensor S1 is attached to a lower surface 12a of a soundboard 12, which represents a vibrating member. Further, rectangular parallelepiped-type fixed members 24-2 and 24-3 are fixed to the lower surface 12a of the soundboard 12. The sensors S2 and S3 are respectively attached to a side surface of the fixed member 24-2 and a side surface of the fixed member 24-3, which are mutually perpendicular.

Figure 5E:
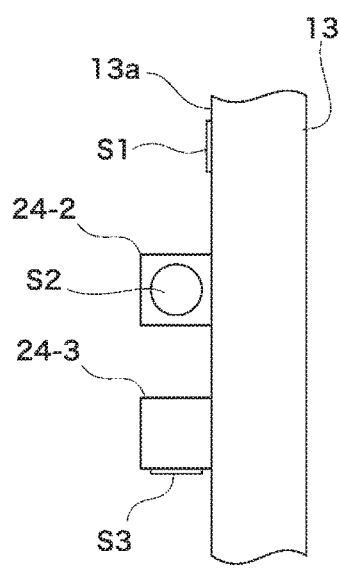
FIG. 5E is a diagram showing an example of individual installation of a sensor in the embodiment of the present invention.

FIG. 5E shows a fifth example of individually installing the sensors S1 to S3. In the fifth example, the sensor S1 is attached to an inner surface 13a (or an outer surface) of a sideboard 13, which represents a vibrating member. Further, rectangular parallelepiped-type fixed members 24-2 and 24-3 are fixed to the inner surface 13a of the sideboard 13. The sensors S2 and S3 are respectively attached to a surface of the fixed member 24-2 and a surface of the fixed member 24-3, which are perpendicular to the thickness direction of the sideboard 13 and are mutually perpendicular.

Application objects of the embodiment of the present invention are in no way limited to an acoustic grand piano as exemplified, and it may also be an upright piano. In the case of an upright piano, the main vibration direction (first direction F1) of the soundboard, which represents a vibrating member, becomes the front and rear direction.

The musical instrument to which the embodiment of the present invention is applied is in no way limited to a piano as exemplified. The embodiment of the present invention is, in addition to a piano, applicable to musical instruments having a vibrating member. The embodiment of the present invention may be applied to string musical instruments such as a guitar, which have a soundboard representing a vibrating member, or electronic musical instruments that vibrate a soundboard representing a vibrating member by means of an exciter for example.

A vibration detection mechanism according to an embodiment of the present invention includes: a first sensor section that detects vibration of a vibrating member of a musical instrument in a first direction being a main vibration direction; a second sensor section that detects vibration of the vibrating member in a second direction being approximately perpendicular to the first direction; and a third sensor section that detects vibration of the vibrating member in a third direction being approximately perpendicular to both the first direction and the second direction. Sensitivity of the second sensor section is greater than sensitivity of the first sensor section. Sensitivity of the third sensor section is greater than the sensitivity of the first sensor section.

According to this vibration detection mechanism, complex vibration of a vibrating member in a musical instrument can be detected with a high quality.

In the vibration detection mechanism described above, the vibrating member may be a soundboard to which a fixed member is fixed, the fixed member having a surface that is approximately perpendicular to the second direction. The second sensor section may be installed on the surface of the fixed member. The second direction may be approximately parallel to a wood grain direction of the soundboard at an installation position of the fixed member on the soundboard.

According to this vibration detection mechanism, it is possible to increase the vibration detection accuracy.

In the vibration detection mechanism described above, the vibrating member may be a soundboard having a first soundboard surface and a second soundboard surface, a bridge being installed on the first soundboard surface, the second soundboard surface being on an opposite side to the first soundboard surface and being approximately perpendicular to the first direction. The first sensor section may be installed on the second surface. The first sensor section may overlap the bridge when viewed from a direction perpendicular to the second soundboard surface. According to this vibration detection mechanism, the vibration detection accuracy can be increased.

In the vibration detection mechanism described above, the vibrating member may be a soundboard having a first soundboard surface and a second soundboard surface, a bridge being installed on the first soundboard surface, the second soundboard surface being on an opposite side to the first soundboard surface, a fixed member being fixed to the second soundboard surface. The fixed member may have a surface approximately perpendicular to the first direction. The first sensor section may be installed on the surface of the fixed member. The first sensor section may overlap the bridge when viewed from a direction perpendicular to the second soundboard surface. According to the vibration detection mechanism, the vibration detection accuracy can be increased.

The soundboard may have a first soundboard surface and a second soundboard surface, a bridge being installed on the first soundboard surface, the second soundboard surface being on an opposite side to the first soundboard surface and being approximately perpendicular to the first direction. The first sensor section may be installed on the second soundboard surface. The first sensor section may overlap the bridge when viewed from a direction perpendicular to the second soundboard surface. According to this vibration detection mechanism, the vibration detection accuracy can be increased.

In the vibration detection mechanism described above, the soundboard may have a first soundboard surface and a second soundboard surface, a bridge being installed on the first soundboard surface, the second soundboard surface being on an opposite side to the first soundboard surface, the fixed member being fixed on the second soundboard surface, and the fixed member has a surface approximately perpendicular to the first direction. The first sensor section may be installed on a surface of the fixed member. The first sensor section may overlap the bridge when viewed from a direction perpendicular to the second soundboard surface. According to this vibration detection mechanism, the vibration detection accuracy can be increased.

The vibration detection mechanism described above may further include: a base that has a first surface, a second surface, and a third surface that are mutually approximately perpendicular. The first sensor section may be arranged on the first surface. The second sensor section may be arranged on the second surface. The third sensor section may be arranged on the third surface. The first surface may be approximately perpendicular to the first direction. The base may be installed on the vibrating member or on a fixed member fixed to the vibrating member.

According to this vibration detection mechanism, it becomes simple to install a sensor that is able to appropriately detect vibration in three axis directions.

In the vibration detection mechanism described above, each of the first, second, and third sensor sections may include: a sensor that detects vibration of the vibrating member; and an amplifier that amplifies the vibration detected by the sensor.

A vibration sensor unit according to an embodiment of the present invention includes: an installation surface for installation on a surface that is of a vibrating member of a musical instrument or a member fixed to the vibrating member being and is approximately perpendicular to a first direction being a main vibration direction; a first surface that is approximately parallel to the installation surface; a second surface that is approximately perpendicular to the first surface; a third surface that is approximately perpendicular to both the first surface and the second surface; a first sensor section that is installed on the first surface and detects vibration of the vibrating member in the first direction; a second sensor section that is installed on the second surface and detects vibration of the vibrating member in a second direction being approximately perpendicular to the first direction; and a third sensor section that is installed on the third surface and detects vibration of the vibrating member in a third direction being approximately perpendicular to both the first direction and the second direction. Sensitivity of the second sensor section is greater than sensitivity of the first sensor section. Sensitivity of the third sensor section is greater than the sensitivity of the first sensor section.

According to this vibration sensor unit described above, it is possible to detect complex vibration of a vibrating member in a musical instrument with a high quality. Furthermore, it becomes simple to install a sensor that is able to appropriately detect vibration in three axis directions.

In the vibration sensor unit described above, the first sensor section may include: a first sensor that is installed on the first surface and detects the vibration in the first direction; and a first amplifier that amplifies the vibration detected by the first sensor. The second sensor section may include: a second sensor that is installed on the second surface and detects the vibration in the second direction; and a second amplifier that amplifies the vibration detected by the second sensor. The third sensor section may include: a third sensor that is installed on the third surface and detects the vibration in the third direction; and a third amplifier that amplifies the vibration detected by the third sensor.

INDUSTRIAL APPLICABILITY

The present invention may be applied to a vibration detection mechanism and a vibration sensor unit.

REFERENCE SYMBOLS

UT, UT 1 Sensor unit
S1, S2, S3 Sensor
12 Soundboard (vibrating member)
12a Lower surface
13 Sideboard (vibrating member)
14 Long bridge (vibrating member)
16 Sound rib (vibrating member)
21 Wood grain
22, 24 Fixed member
22a Upper surface
24a Lower surface
30 Base (fixed member)
51, 52, 53 Sensor section
100 Acoustic apparatus
F1 First direction
F2 Second direction
F3 Third direction
P1 First surface
P2 Second surface
P3 Third surface

The invention claimed is:
1. A vibration detection mechanism comprising:
a first sensor section that detects vibration of a vibrating member of a musical instrument in a first direction being a main vibration direction;
a second sensor section that detects vibration of the vibrating member in a second direction being perpendicular to the first direction; and
a third sensor section that detects vibration of the vibrating member in a third direction being perpendicular to both the first direction and the second direction,
wherein a sensitivity of the second sensor section that detects vibration of the vibrating member in the second direction perpendicular to the first direction is greater than a sensitivity of the first sensor section that detects vibration of the vibrating member in the first direction being the main vibration direction, and a sensitivity of the third sensor section that detects vibration of the vibrating member in the third direction perpendicular to both the first direction and the second direction is greater than the sensitivity of the first sensor section.

2. The vibration detection mechanism according to claim 1,
wherein the vibrating member is a soundboard to which a fixed member is fixed, the fixed member having a surface that is perpendicular to the second direction,
the second sensor section is installed on the surface of the fixed member, and
the second direction is parallel to a wood grain direction of the soundboard at an installation position of the fixed member on the soundboard.

3. The vibration detection mechanism according to claim 1,
wherein the vibrating member is a soundboard having a first soundboard surface and a second soundboard surface, a bridge being installed on the first soundboard surface, the second soundboard surface being on an opposite side to the first soundboard surface and being perpendicular to the first direction, and
the first sensor section is installed on the second soundboard surface, and the first sensor section overlaps the bridge when viewed from a direction perpendicular to the second soundboard surface.

4. The vibration detection mechanism according to claim 1,
wherein the vibrating member is a soundboard having a first soundboard surface and a second soundboard surface, a bridge being installed on the first soundboard surface, the second soundboard surface being on an opposite side to the first soundboard surface, a fixed member being fixed to the second soundboard surface, and the fixed member has a surface perpendicular to the first direction, and
the first sensor section is installed on the surface of the fixed member, and the first sensor section overlaps the bridge when viewed from a direction perpendicular to the second soundboard surface.

5. The vibration detection mechanism according to claim 1,
wherein the vibrating member is a soundboard having a first soundboard surface and a second soundboard surface, a bridge being installed on the first soundboard surface, the second soundboard surface being on an opposite side to the first soundboard surface and being perpendicular to the first direction, and
the first sensor section is installed on the second soundboard surface, and the first sensor section overlaps the bridge when viewed from a direction perpendicular to the second soundboard surface.

6. The vibration detection mechanism according to claim 1,
wherein the vibrating member is a soundboard having a first soundboard surface and a second soundboard surface, a bridge being installed on the first soundboard surface, the second soundboard surface being on an opposite side to the first soundboard surface, a fixed member being fixed on the second soundboard surface, and the fixed member has a surface perpendicular to the first direction, and the first sensor section is installed on the surface of the fixed member, and the first sensor section overlaps the bridge when viewed from a direction perpendicular to the second soundboard surface.

7. The vibration detection mechanism according to claim 1, further comprising:

a base that has a first surface, a second surface, and a third surface that are mutually perpendicular, wherein the first sensor section is arranged on the first surface, the second sensor section is arranged on the second surface, and the third sensor section is arranged on the third surface, and the first surface is perpendicular to the first direction, and the base is installed on the vibrating member or on a fixed member fixed to the vibrating member.

8. The vibration detection mechanism according to claim 1, wherein each of the first, second, and third sensor sections includes: a sensor that detects vibration of the vibrating member; and an amplifier that amplifies the vibration detected by the sensor.

9. A vibration sensor unit comprising:

an installation surface for installation on a surface that is of a vibrating member of a musical instrument or a member fixed to the vibrating member and is perpendicular to a first direction being a main vibration direction;

a first surface that is parallel to the installation surface;

a second surface that is perpendicular to the first surface;

a third surface that is perpendicular to both the first surface and the second surface;

a first sensor section that is installed on the first surface and detects vibration of the vibrating member in the first direction;

a second sensor section that is installed on the second surface and detects vibration of the vibrating member in a second direction being perpendicular to the first direction; and a third sensor section that is installed on the third surface and detects vibration of the vibrating member in a third direction being perpendicular to both the first direction and the second direction, and wherein sensitivity of the second sensor section is greater than sensitivity of the first sensor section, and sensitivity of the third sensor section is greater than the sensitivity of the first sensor section.

10. The vibration sensor unit according to claim 9, wherein the first sensor section includes: a first sensor that is installed on the first surface and detects the vibration in the first direction; and a first amplifier that amplifies the vibration detected by the first sensor, the second sensor section includes: a second sensor that is installed on the second surface and detects the vibration in the second direction; and a second amplifier that amplifies the vibration detected by the second sensor, and the third sensor section includes: a third sensor that is installed on the third surface and detects the vibration in the third direction; and a third amplifier that amplifies the vibration detected by the third sensor.

\* \* \* \* \*